(12) United States Patent
Fort, II

(10) Patent No.: US 6,834,616 B2
(45) Date of Patent: Dec. 28, 2004

(54) BIRD FEEDER

(75) Inventor: W. Grady Fort, II, Mason, TX (US)

(73) Assignee: Daisy Manufacturing Co., Rogers, AR (US)

( * ) Notice: Subject to any disclaimer, the term of this patent is extended or adjusted under 35 U.S.C. 154(b) by 0 days.

(21) Appl. No.: 10/339,316

(22) Filed: Jan. 10, 2003

(65) Prior Publication Data

US 2004/0134437 A1 Jul. 15, 2004

(51) Int. Cl.$^7$ ............................................. A01K 39/01
(52) U.S. Cl. ...................................... 119/57.8; 119/53
(58) Field of Search .......................... 119/61.31, 57.8, 119/52.2, 52.3, 57.9, 53, 52.4; 222/142.9

(56) References Cited

U.S. PATENT DOCUMENTS

| | | | | |
|---|---|---|---|---|
| 3,780,703 A | * | 12/1973 | Boehland, Jr. | 119/53 |
| 3,822,674 A | * | 7/1974 | Tobin | 119/53 |
| 4,102,308 A | * | 7/1978 | Kilham | 119/52.3 |
| 4,380,307 A | * | 4/1983 | Stillinger | 222/142.9 |
| 4,832,235 A | * | 5/1989 | Palmer | 222/370 |
| 4,977,859 A | * | 12/1990 | Kilham | 119/52.2 |
| 5,062,388 A | * | 11/1991 | Kilham | 119/52.2 |
| 5,123,574 A | * | 6/1992 | Poulos | 222/362 |
| 5,427,343 A | * | 6/1995 | Ferris | 248/215 |
| 5,558,040 A | * | 9/1996 | Colwell et al. | 119/52.2 |
| 5,596,946 A | * | 1/1997 | Bryant et al. | 119/52.1 |
| 5,791,286 A | * | 8/1998 | Taussig et al. | 119/52.3 |
| 5,829,384 A | * | 11/1998 | Landry | 119/52.3 |
| 6,543,383 B1 | * | 4/2003 | Cote | 119/57.8 |
| 6,543,384 B2 | * | 4/2003 | Cote | 119/57.9 |
| 6,550,640 B2 | * | 4/2003 | Smith | 222/1 |
| 6,601,734 B1 | * | 8/2003 | Smith | 222/142.9 |
| 6,640,745 B1 | * | 11/2003 | Park | 119/52.2 |

* cited by examiner

*Primary Examiner*—Michael J. Carone
*Assistant Examiner*—Kimberly S. Smith
(74) *Attorney, Agent, or Firm*—Poh C. Chua; Shaw Pittman LLP (57) ABSTRACT

A bird feeder having a container, a selector, and a base is disclosed. The selector has at least one large opening and at least one small opening. The base includes at least one feeding port. When one of the openings is aligned with the feeding port, the other opening is covered by a perimeter wall of the base. In preferred embodiments, the base includes a rain guard above the feeding ports.

4 Claims, 10 Drawing Sheets

BIRD FEEDER

BACKGROUND

1. Field of the Invention

The present invention relates generally to a bird feeder and, more particularly, to a bird feeder having a food selector.

2. Background of the Invention

Commonly available bird feeders can be used with only one type of seed. For example, some bird feeders are used to store and dispense larger seeds (e.g., sunflower seeds, safflower seeds, or a mixed seeds blend), while other bird feeders are designed for smaller seeds (e.g., thistle seeds, finch seeds, and niger seeds).

Few bird feeders are designed to selectively feed one of larger and smaller seeds. These bird feeders are equipped with feeding ports that are externally removable or a swinging selector. A larger feeding port is attached to these bird feeders to allow larger seed size use. The larger feeding port can then be removed externally and replaced with a smaller feeding port to feed smaller seeds. Disadvantages of these conventional bird feeders include frequent loss of the feeding ports by the user. Another disadvantage is that a swinging selector of a conventional bird feeder can be broken off easily.

SUMMARY OF THE INVENTION

The present invention is a bird feeder and a method for making the bird feeder. An embodiment of the bird feeder includes a container, a base attached to the container, and a selector that is detachably housed within the base. The selector includes a large opening and a small opening. Preferably, the container includes a cavity configured to store a bird food. Preferably, the base includes a reservoir configured to receive the bird food from the container. Preferably, one of the large opening and the small opening is configured to align with a feeding port on the base to expose the bird food. Preferably, when one of the openings is aligned with the feeding port, the other opening is covered by a perimeter wall of the base. Preferably, the bird feeder further includes a hanging device attached to the container. Preferably, the bird feeder further includes a blind hole on a bottom surface of the base.

BRIEF DESCRIPTION OF PREFERRED EMBODIMENTS

DETAILED DESCRIPTION OF PREFERRED EMBODIMENTS

Figure 1:
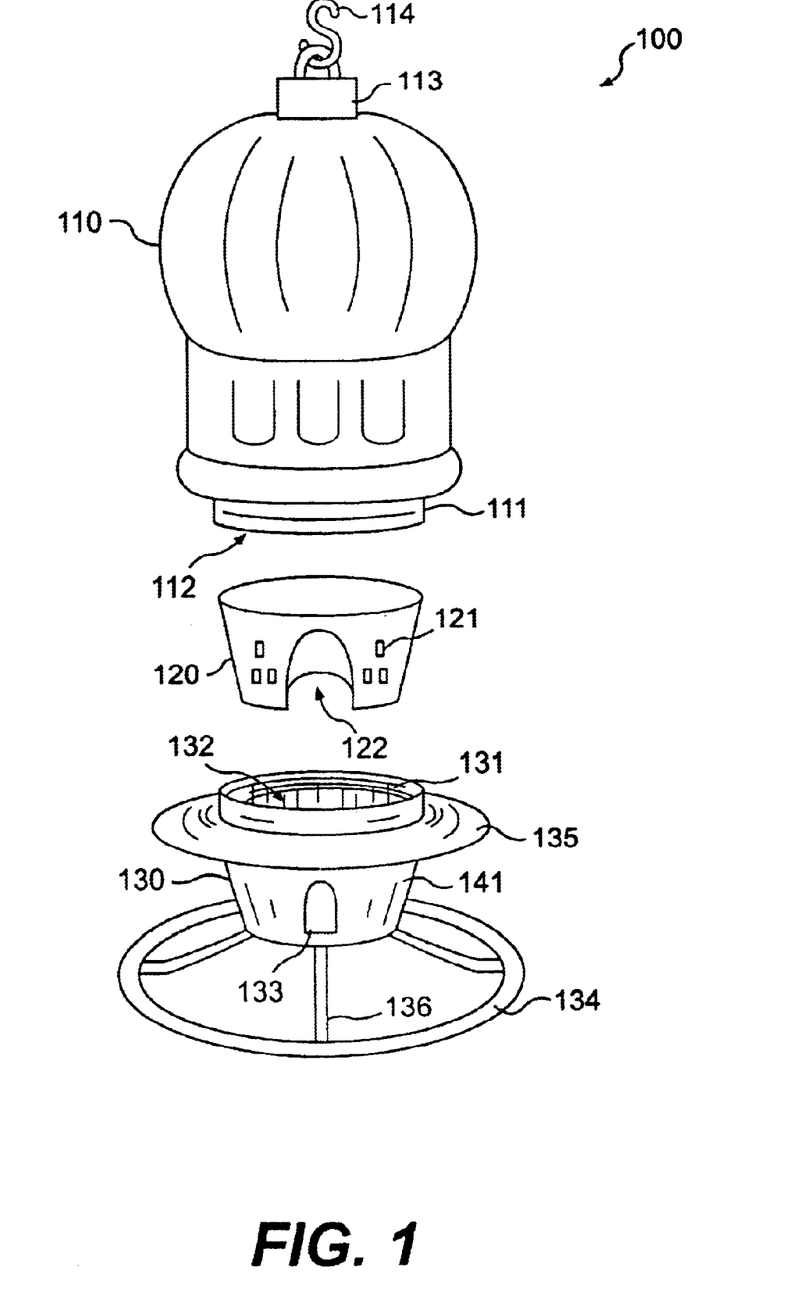
FIG. 1 is a schematic diagram showing an exploded view of a bird feeder of the invention.
Figure 2:
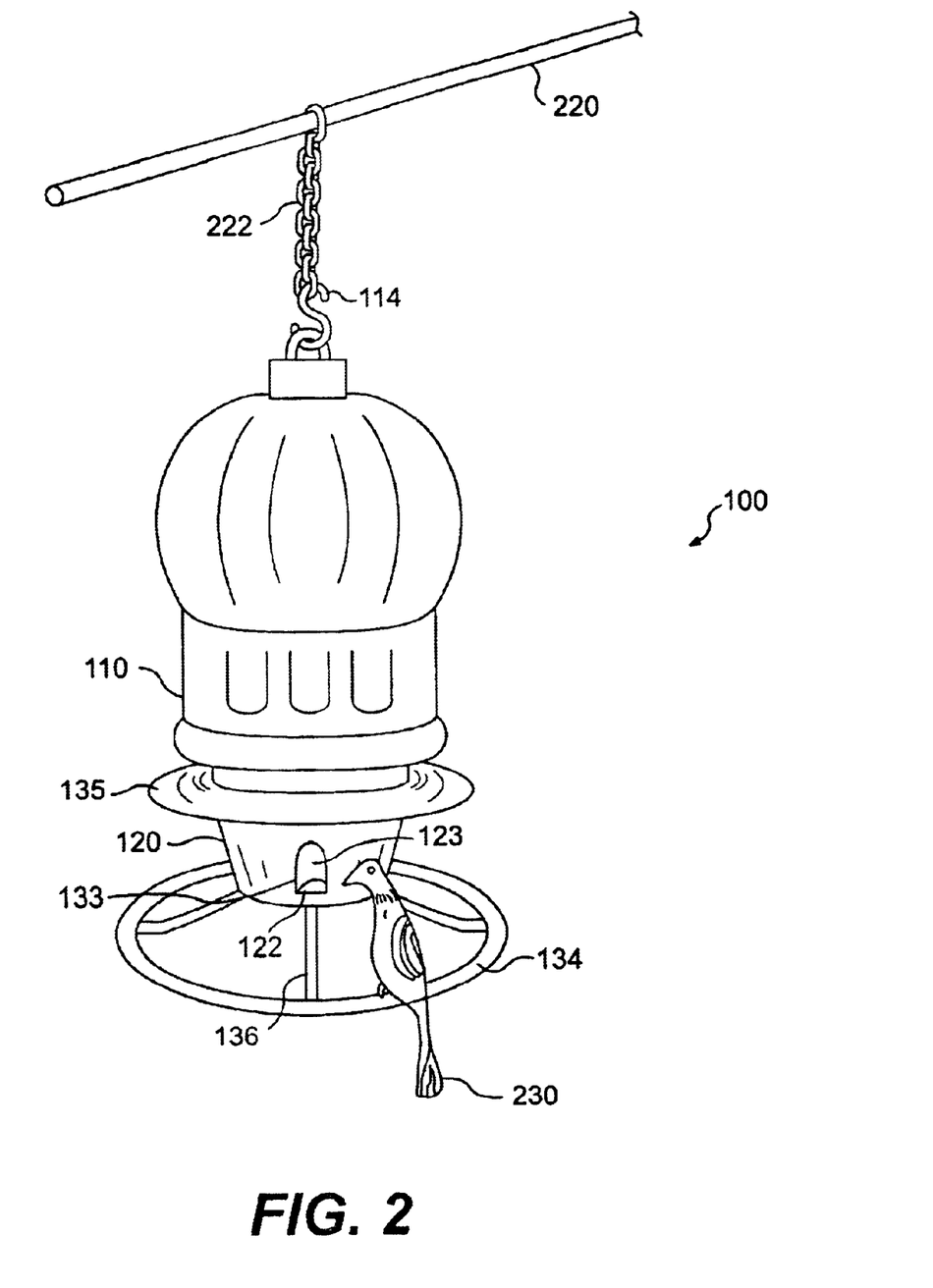
FIG. 2 is a schematic diagram showing a perspective view of the bird feeder fully assembled.
Figure 9:
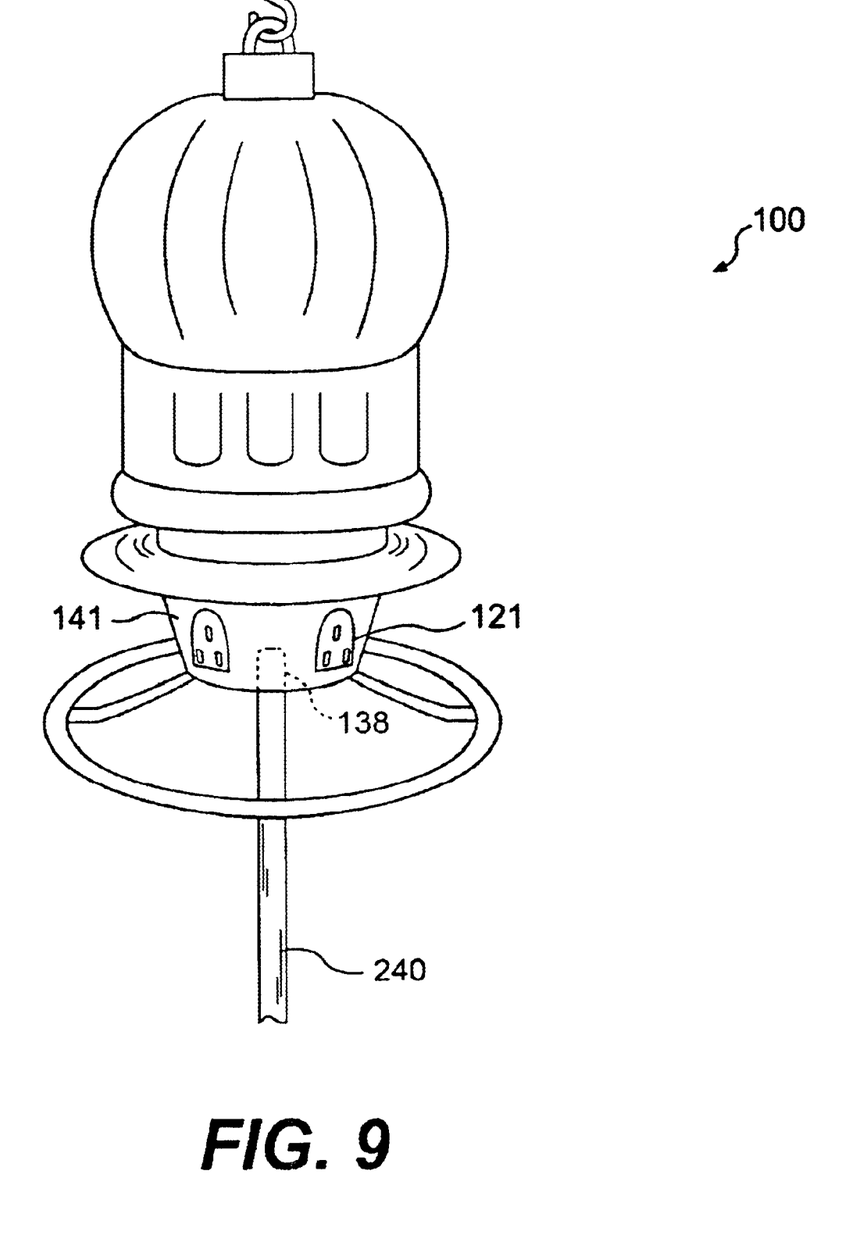
FIG. 9 is a schematic diagram showing an alternative method for using the bird feeder.

As shown in FIG. 1, feeder 100 of the invention includes container 110, selector 120, and base 130. These three members of feeder 100 can be completely separated from each other as depicted in FIG. 1. When fully assembled as shown in FIGS. 2 and 9, selector 120 is wholly captured by base 130, and large openings 122 (see FIG. 2) or small openings 121 (see FIG. 9) are visible. In this configuration, large openings 122 and small openings 121 cannot both be seen at the same time. Since selector 120 is completely housed within base 130, it is very difficult for a user to misplace or damage it.

Figure 10:
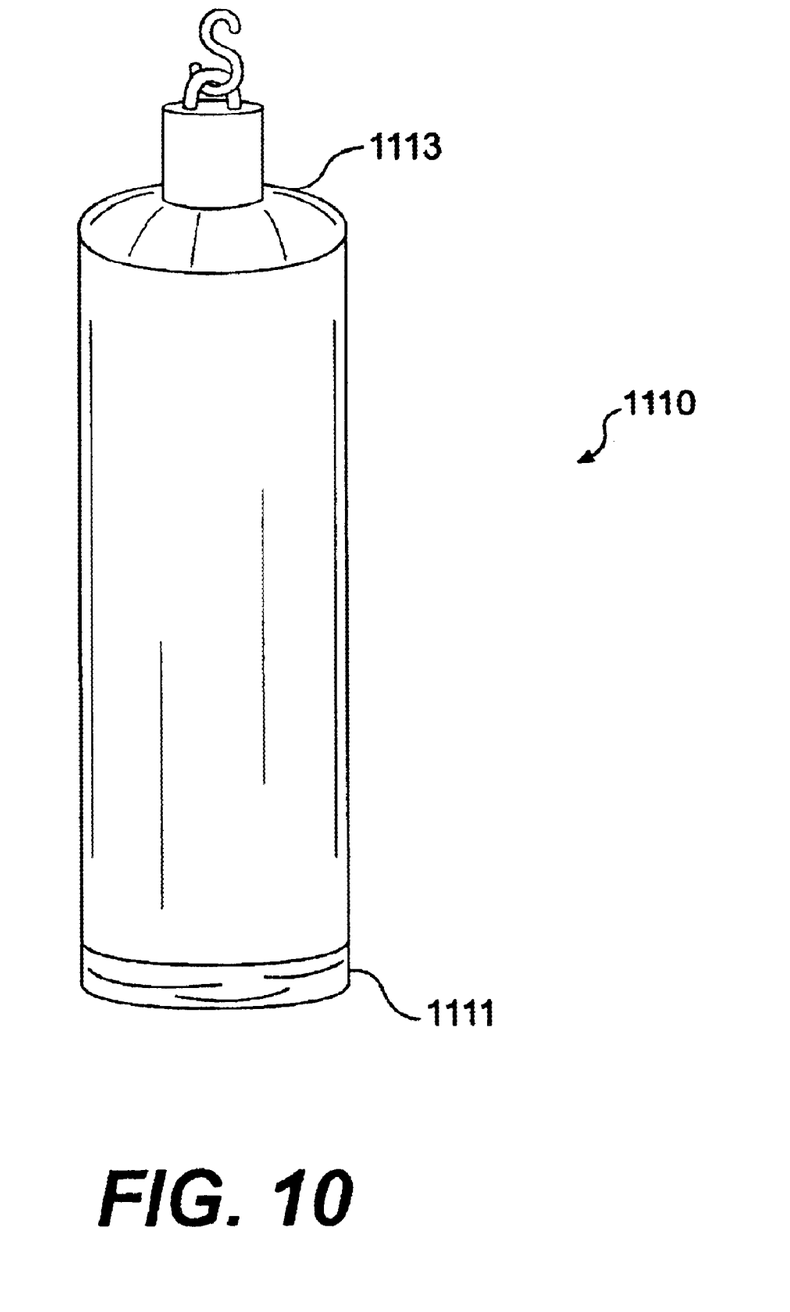
FIG. 10 is a schematic diagram showing an alternative design of the container.

Container 110 is configured to hold bird food (not shown) in cavity 112. Preferably, cavity 112 is configured to store about five pounds of the bird food. Container 110 may have a dome shape as shown in FIG. 1. Alternatively, container 110 may be configured to have a more conventional cylindrical shape as shown in FIG. 10. Container 1110 shown in FIG. 10 includes container thread 1111 and cap 1113. Container thread 1111 is configured to mate with base thread 131 of base 130. Other shapes may be configured for container 110.

Container 110 includes cap 113 and hanging device 114. Hanging device 114 can be used to attach feeder 100 to an external support. For example, as shown in FIG. 2, hanging device 114 can be used to hang feeder 100 on beam 220 using chain 222. Beam 220 may be attached to another structure (not shown) such as, for example, a roof, a wall, a pole, and the like. Although hanging device 114 is depicted in the drawings as an "S" hook, hanging device 114 can be a clip, j-hook, snap hook, rope, wire or the like. Container 110 further includes container thread 111. Container thread 111 is configured to mate with base thread 131 of base 130.

Figure 3:
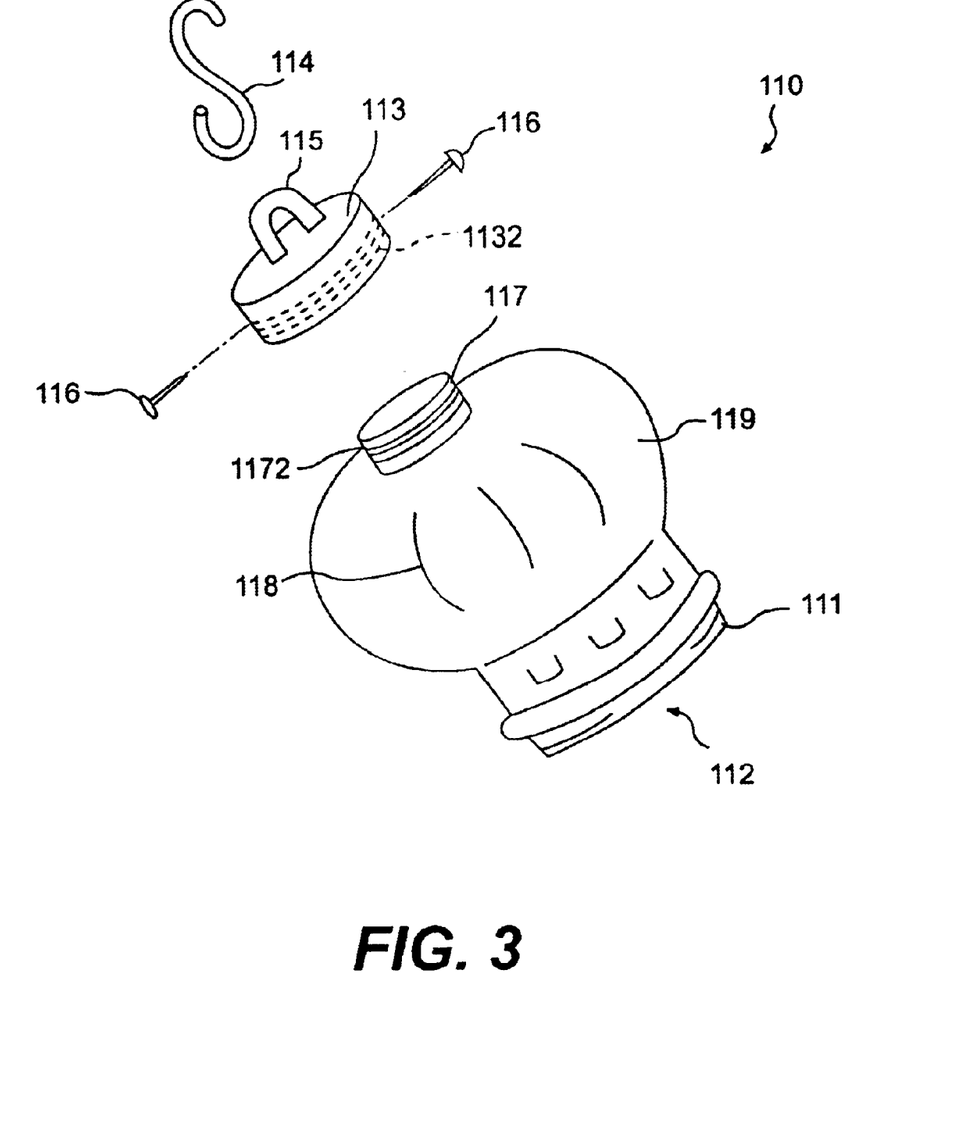
FIG. 3 is a schematic diagram showing an exploded view of a container of the bird feeder.

Preferably, container 110 is of a one-piece design without any opening other than the hole defined by container thread 111. The hole provides access to cavity 112. Preferably, container 110 includes body 119 as shown in FIG. 3. Preferably, body 119 has a dome shape. Preferably, body 119 has ribs 118. Ribs 118 serve at least two functions. First, ribs 118 can add strength to body 119. In addition, if body 119 is made of a material having a translucent appearance, ribs 118 can refract light from body 119 to make it more visible and attractive.

Preferably, body 119 is made of a blow-molded plastic. Preferably, body 119 has no opening other than the hole defined by container thread 111. Preferably, body 119 includes blind plug 117. Preferably, blind plug 117 has a disk shape as shown in FIG. 3 and external thread 1172.

Cap 113. has an inner dimension that is slightly larger than the outer dimension of blind plug 117. For example, if each of cap 113 and blind plug 117 has a circular cross-section, then the inner diameter of cap 113 is slightly larger than the outer diameter of blind plug 117. Cap 113 has internal thread 1132 that is configured to mate with external thread 1172.

Cap 113 is preferably attached or secured to blind plug 117 by mating internal thread 1132 with external thread 1172. In another embodiment, one or more fasteners 116 can be used to attach cap 113 to blind plug 117. Fasteners 116 can be, for example, screws, bolts, nails, rivets, and the like. Alternatively, cap 113 can be attached to blind plug 117 using an adhesive.

Cap 113 includes loop 115. Loop 115 is configured to receive one end of hanging device 114. Preferably, loop 115 and cap 113 are an integrated unit.

Figure 12:
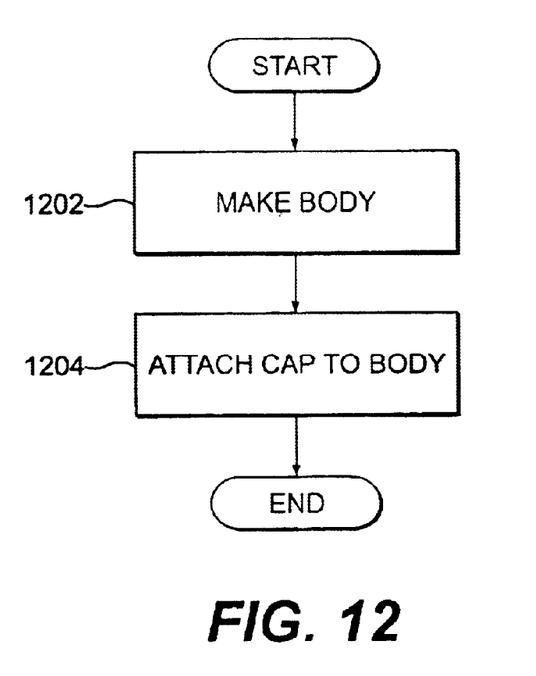
FIG. 12 is a flowchart showing an exemplary process involved in making a container of the bird feeder.

As disclosed, cap 113 and blind plug 117 allow feeder 100 to be hung as shown in FIG. 2. External thread 1172 and internal thread 1132 provide a method for hanging feeder 100 without using a pass-through bolt or other attachment that must penetrate into the interior of container 119, and without adhesive. As known in the art, pass-through attachments are subject to leakage and glues can come apart. FIG. 12 discloses a method for making container 110.

Figure 4:
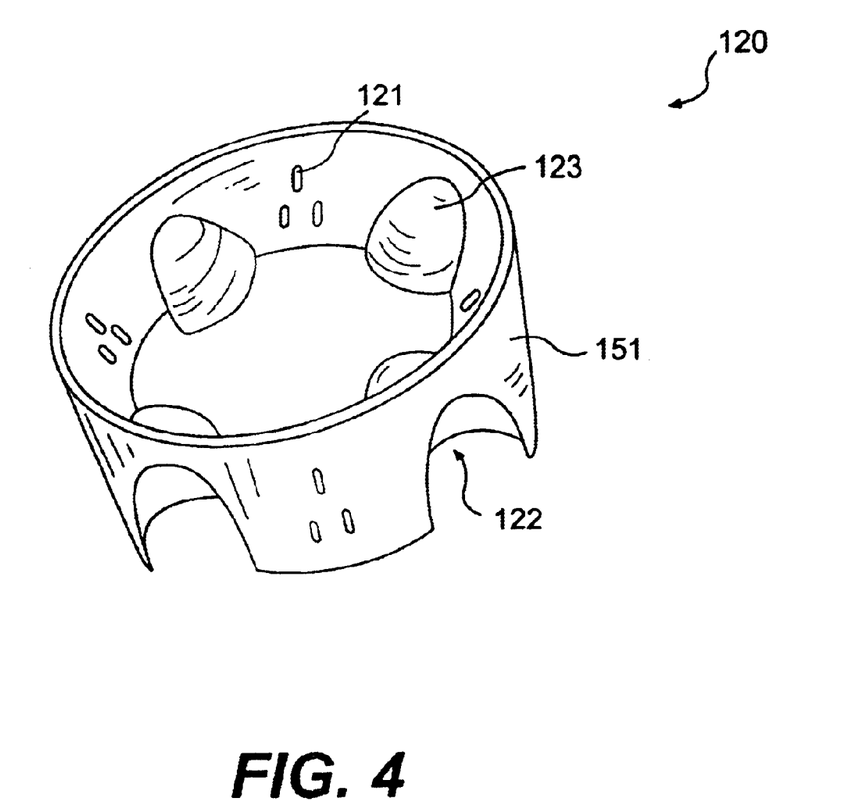
FIG. 4 is a schematic diagram showing a perspective view of a selector of the bird feeder.
Figure 5:
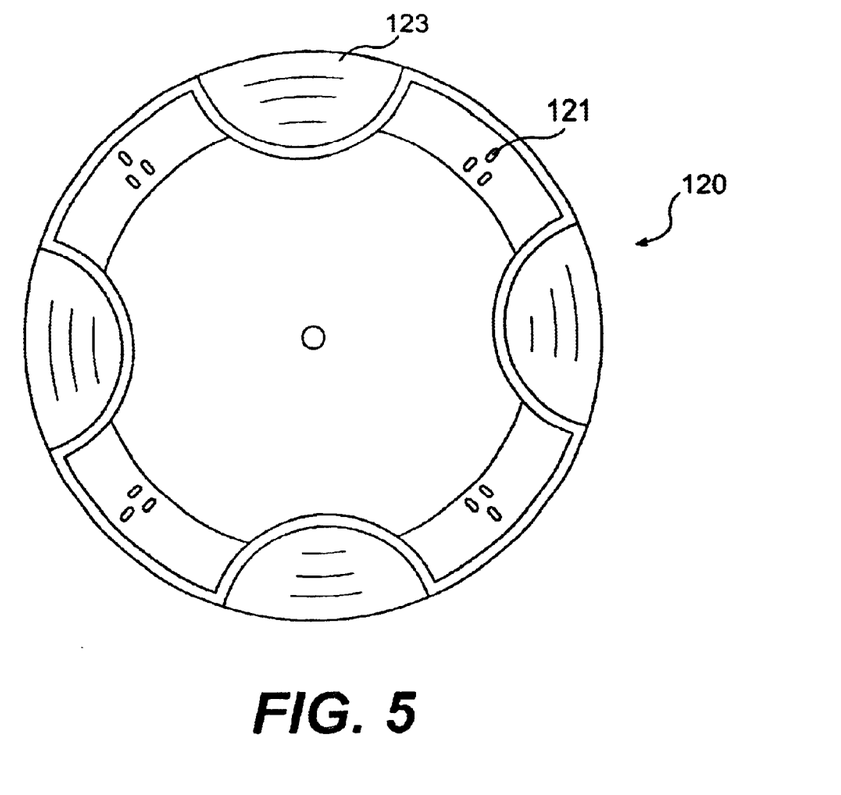
FIG. 5 is a schematic diagram showing a top view of the selector.
Figure 6:
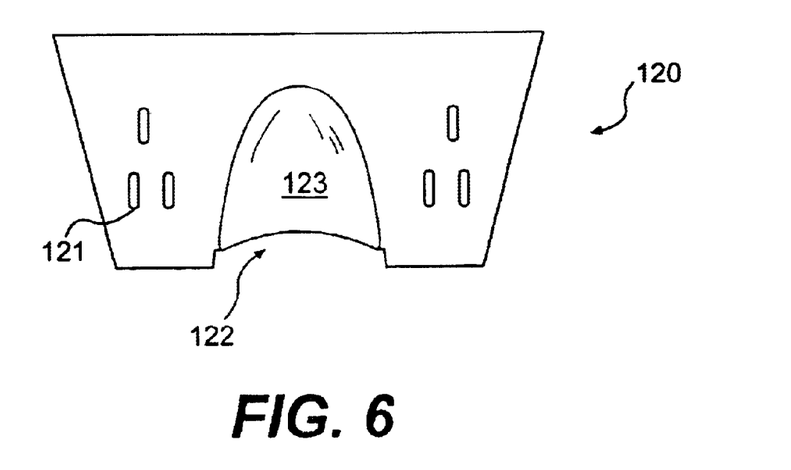
FIG. 6 is a schematic diagram showing a side view of the selector.

As depicted in FIGS. 4–6, selector 120 includes at least one small opening 121 and at least one large opening 122. Preferably, there are multiple small openings 121 and large openings 122. As depicted in FIGS. 4–6, selector 120 includes 12 small openings 121 organized in four groups of three and four large openings 122. Small openings 121 are holes on perimeter wall 151. Each of large openings 122 is defined by curved wall 123 and bottom surface 139 of base 130 (see FIG. 7).

Small openings 121 are preferably roughly a rectangle in shape as depicted in the drawings. Small openings 121, however, may be elliptical, triangular, circular, or another shape. Small openings 121 are configured to allow passage of a bird food of a small granular size. For example, small openings 121 should be large enough to allow passage of small seeds such as thistle, finch, and niger seeds. Accordingly, it is preferable that small openings 121 have a shorter dimension of about one-sixteenth of an inch and a longer dimension of about one-quarter of an inch. As shown in FIG. 9, small openings 121 are aligned with feeding ports 133 when small seeds are stored in container 110.

If large seeds are stored in container 110, then large openings 122 are aligned with feeding ports 133 as shown in FIG. 2. Each of large openings 122 is defined by curved wall 123 of selector 120 and bottom surface 139 of base 130. Large openings 122 are configured to allow passage of a bird food of a larger granular size. For example, large openings 122 should be large enough to allow passage of sunflower seeds, safflower seeds, or a mixed seeds blend. Accordingly, it is preferable that large openings 122 have a shorter dimension of about one-half inch and a longer dimension of about one and one-half inches.

Base 130 includes base thread 131 (see FIG. 1), reservoir 132 (see FIG. 7), feeding ports 133, and perch ring 134. Perch ring 134, as depicted in FIG. 2, is configured to support bird 230 to obtain the bird food through feeding port 133. Perch ring 134 is connected to base 130 via spokes 136. Reservoir 132 is defined by bottom surface 139 and perimeter wall 141.

Preferably, spokes 136 are located directly in front of feeding ports 133. This enables smaller birds to sit on spokes 136 and feed, while larger birds utilize perch ring 134 to feed. This configuration of perch ring 134 and spokes 136 allows birds of all sizes to use feeder 100 comfortably.

Preferably, there are four feeding ports 133. As depicted in FIG. 2, feeding ports 133 are aligned with large openings 122 while small openings 121 are covered by perimeter wall 141. As depicted in FIG. 9, each of feeding ports 133 is aligned with a group of three small openings 121 while large openings 122 are covered by perimeter wall 141.

Base 130 can be further configured to include an integral rain guard 135. Rain guard 135 as depicted in FIG. 2, is configured to keep rain from running into feeding port 133, yet does not obstruct bird 230's view.

Figure 11:
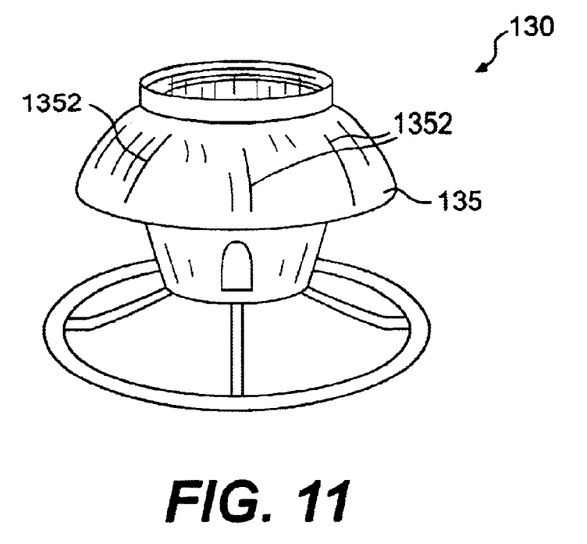
FIG. 11 is a schematic diagram showing an alternative design of the base having a dome-shape rain guard with ribs.

Preferably, rain guard 135 is located about one and one-half inches above the bottom of feeding port 133. Alternatively, rain guard 135 can be located about three inches above perch ring 134. The unique placement of rain guard 135 allows larger birds such as a cardinal to sit upright on perch ring 134, yet easily duck under to feed. Preferably, as shown in FIG. 2, rain guard 135 is flat. Alternatively, as shown in FIG. 11, rain guard 135 has a dome shape. A dome-shape rain guard 135 can be equipped with ribs 1352. Ribs 1352 adds strength to rain guard 135. In addition, if rain guard 135 is configured to have a translucent color, ribs 1352 can refract light from the translucent color to make rain guard 135 more visible and attractive. In one embodiment, rain guard 135 is an integral member of base 130. In an alternative embodiment, rain guard 135 can be a secondary snap on attachment.

Figure 7:
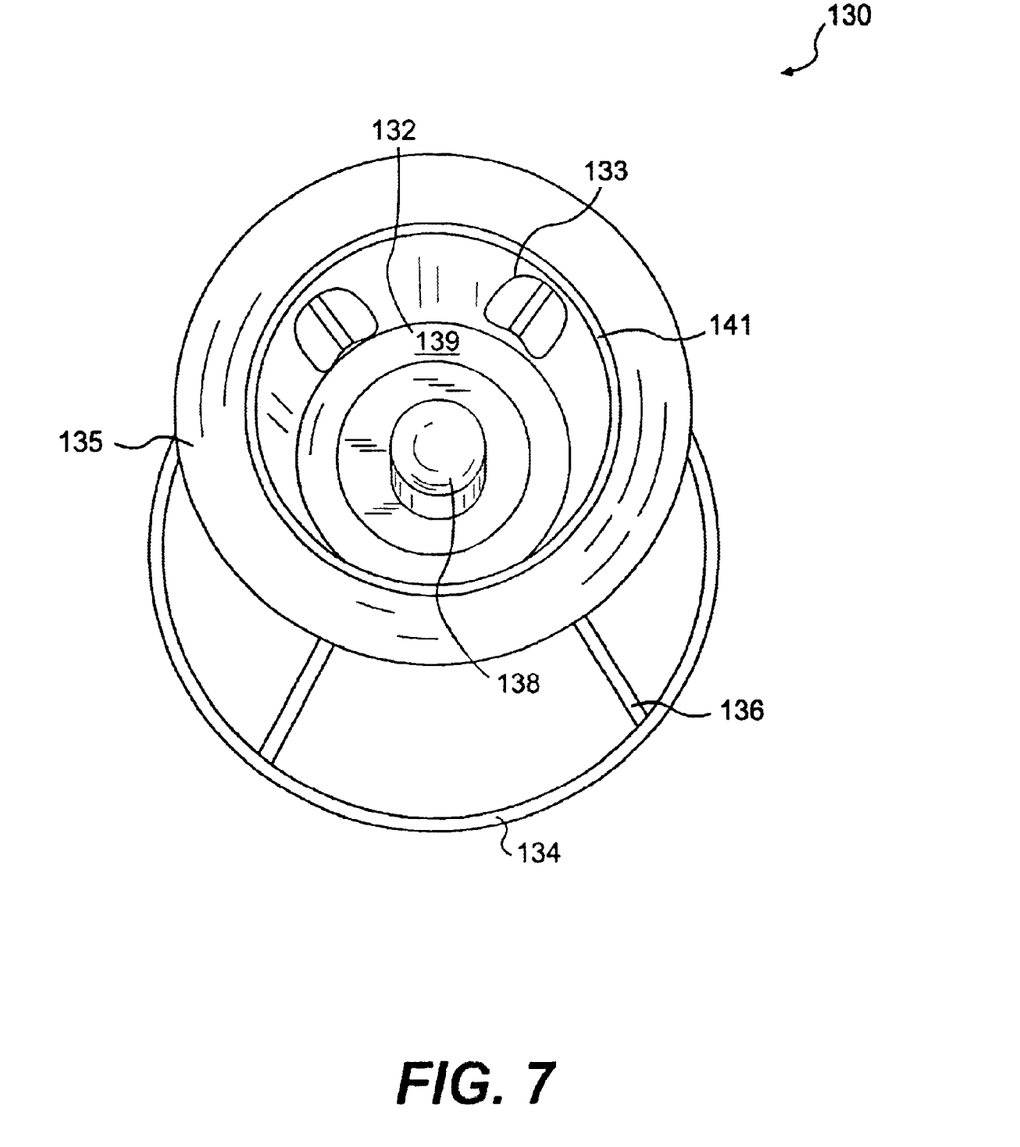
FIG. 7 is a schematic diagram showing a perspective view of a base of the bird feeder.
Figure 8:
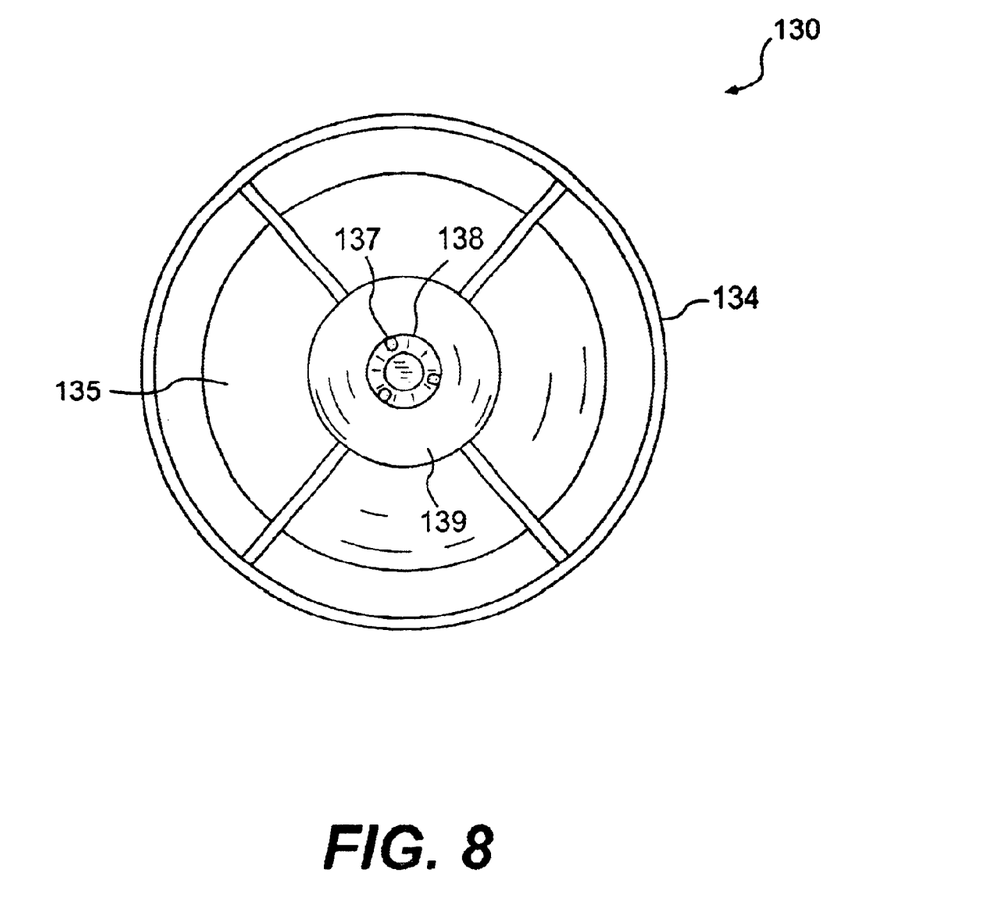
FIG. 8 is a schematic diagram showing a bottom view of the base.

As shown in FIGS. 7 and 8, base 130 includes blind hole 138. Blind hole 138 is configured to receive pole 240 as shown in FIG. 9. Preferably, blind hole 138 includes internal ridges 137. Internal ridges 137 are preferably sloping ridges having a smaller dimension on one end and a larger dimension on the other end. For example, in an exemplary embodiment, internal ridges 137 are one-thirty-second of an inch thick on one end (e.g., near bottom surface 139) and one-sixteenth of an inch thick on the other (e.g., about three-quarters of an inch from bottom(surface 139). Sloping internal ridges 137 provide a better attachment to pole 240.

As depicted in FIG. 8, there are preferably three internal ridges 137. Internal ridges 137 secures base 130 on pole 240. Pole 240 can be, for example, a standard EMT (electrical metal tubing) conduit or another vertical structure. Preferably, blind hole 138 is about one inch in diameter. Preferably, blind hole 138 is about three-quarters of an inch deep. Preferably, each of internal ridges 137 is about one-sixteenth of an inch thick on one end and sloping to one thirty-second of an inch think on the other end.

Feeder 100 can be utilized by a user as follows. First, base 130 is separated from container 110. This can be accomplished by rotating base 130 relative to container 110 so that container thread 111 and base thread 131 can be separated. Next, container 110 is turned upside down and a bird food is placed within cavity 112 of container 110.

Next, selector 120 is removed from base 130. If the size of the bird food is small, selector 120 is reinserted into base 130 so that small openings 121 are aligned with feeding ports 133. On the other hand, if the size of the bird food is larger, selector 120 is reinserted into base 130 so that larger openings 122 are aligned with feeding ports 133.

Next, container 110 and base 130 are reunited. This is accomplished by matching container thread 111 with base thread 131 while continuing to hold base 130 in inverted position to avoid seeds from spilling out, and then rotating one or both of container 110 and base 130 to secure them together. Selector 120 can be held securely in base 130 by press fit so it does not fall when base 130 is inverted.

Next, feeder 100 is supported at a location where birds are present. This can be done in several ways. For example, as shown in FIG. 2, feeder 100 can be hung from chain 222 to an external support such as beam 220. Alternatively, as shown in FIG. 9, feeder 100 can be mounted on a vertical support such as pole 240.

To refill or clean bird feeder 100, container 110 is separated from base 130, and each of container 110, selector 120, and base 130 can be cleaned separately.

FIG. 12 is a flowchart showing an exemplary process involved in making a container of the bird feeder.

In step 1202, body 119 of container 110 is made. Preferably, container 110 is made of a PET (polyethylene terephthalate) plastic. Typically, a PET container can be created in a two-step process in which a pre-form is made first with an injection molded threaded opening, and this piece is next heated and blown into the shape of the container. Preferably, container 110 is made using a special high volume blow molding machine. Container 110 may have any color. Container 110 may also be made of a translucent material. Moreover, container 110 may be configured to have a transparent appearance.

Preferably, blind plug 117, rib 118, and container thread 111 are integrally formed with body 119 to define cavity 112. Preferably, container thread 111 is formed at one end and blind plug 117 is created at the other end of body 119. Preferably, as shown in FIG. 3, blind plug 117 is configured to include external thread 1172. External thread 1172 is configured to mate with internal thread 1132 of cap 113.

In step 1204, cap 113 is attached onto blind plug 117 by mating internal thread 1132 with external thread 1172. The attachment can also be made using fasteners 116. Fastener 116 can be screws, nails, rivets, and the like. Loop 115 is configured to receive hanging device 114 for hanging feeder 100.

As disclosed, the present invention provides a method for PET blow molding that produces a one-piece, integral container that has no chance of leakage, either in or out.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A bird feeder comprising:

a container;

a base configured to mate with the container, wherein the base includes a feeding port;

a selector detachably housed within the base, wherein the selector includes a large opening and a small opening, one of the large opening and the small opening is aligned with the feeding port, the other opening is covered by a perimeter wall of the base; and a rain guard attached to the base at a position above the feeding port.

2. The bird feeder of claim 1, wherein the rain guard is integrally molded to the base.

3. The bird feeder of claim 1, wherein the rain guard is a secondary unit that is detachably attached to the base.

4. The bird feeder of claim 1, wherein the rain guard has a dome shape.

\* \* \* \* \*